(12) United States Patent
Gaylord

(10) Patent No.: US 6,628,334 B1
(45) Date of Patent: Sep. 30, 2003

(54) METHOD AND APPARATUS FOR IMPROVING IMAGE SIGNALS

(75) Inventor: Jeremy B. Gaylord, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/103,647

(22) Filed: Jun. 23, 1998

(51) Int. Cl.[7] .............................................. H04N 5/238
(52) U.S. Cl. ................................... 348/364; 348/229.1
(58) Field of Search ................................ 348/255, 678, 348/552, 311, 296, 308, 231, 362, 363, 364, 366, 231.99, 231.3, 231.6, 295, 297; 358/518, 519, 520, 521; H04N 5/236

(56) References Cited

U.S. PATENT DOCUMENTS

| | | | |
|---|---|---|---|
| 5,361,140 A | * 11/1994 | Hayenga et al. | 348/255 |
| 5,710,602 A | 1/1998 | Gardos et al. | |
| 5,712,682 A | 1/1998 | Hannah | |
| 5,737,018 A | * 4/1998 | Shimizu et al. | 348/363 |
| 6,124,891 A | * 9/2000 | Homma et al. | 348/364 |
| 6,163,342 A | * 12/2000 | Suzuki | 348/364 |
| 6,201,575 B1 | * 3/2001 | Sano | 348/363 |
| 6,480,226 B1 | * 11/2002 | Takahashi et al. | 348/296 |

* cited by examiner

Primary Examiner—Tuan Ho
(74) Attorney, Agent, or Firm—Blakely, Sokoloff, Taylor & Zafman LLP

(57) ABSTRACT

A video camera comprises a gain control unit and an exposure control unit. The gain control unit amplifies selected image signals of a first charge image according to a gain profile to generate a second charge image. The exposure control unit analyzes the image signals of the second charge image to adjust an exposure duration or an aperture.

24 Claims, 8 Drawing Sheets

METHOD AND APPARATUS FOR IMPROVING IMAGE SIGNALS

FIELD OF THE INVENTION

The present invention relates to video cameras. More specifically, the present invention relates to a method and apparatus for improving image signals generated by a video camera by controlling the gain applied to the image signals.

BACKGROUND OF THE INVENTION

Most modern video cameras utilize a charged coupled device (CCD) image sensor. The CCD image sensor typically includes roughly between 320,000 to 500,000 microscopically small light sensitive cells. An image for recording is projected via a lens on the video camera onto the CCD image sensor. The image projected onto the CCD image sensor charges the cells electrically. The brighter the incoming light, the more powerfully the cells are charged. The charged cells produce a charge image that includes a plurality of image signals that corresponds to light and color information of the recorded image.

Most video cameras require the exposure level of the CCD image sensor to be within a defined range for the CCD image sensor to produce image signals at a strength that forms a high quality charge image. When the exposure level is outside of the defined range, the recorded image may appear to be too dark or too bright. Proper exposure depends both on the amount of light entering the lens and the amount of time during which the incoming light forms a single video field. The amount of light entering the lens of the video camera may be regulated automatically or manually by adjusting the aperture of the iris. The amount of time allowed for storing the light in the CCD image sensor may be regulated by adjusting a "metaphoric" shutter speed that governs the amount of time allowed for storing light in the CCD image sensor.

If the exposure level of the CCD image sensor cannot be adjusted to fall within the defined range, some cameras allow the strength of the image signals generated by the CCD image sensor to be amplified to improve the quality of the charge image. Videotographers using current video cameras who wish to amplify or apply "gain" to image signals are provided with only a limited selection of how the image signals may be amplified.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
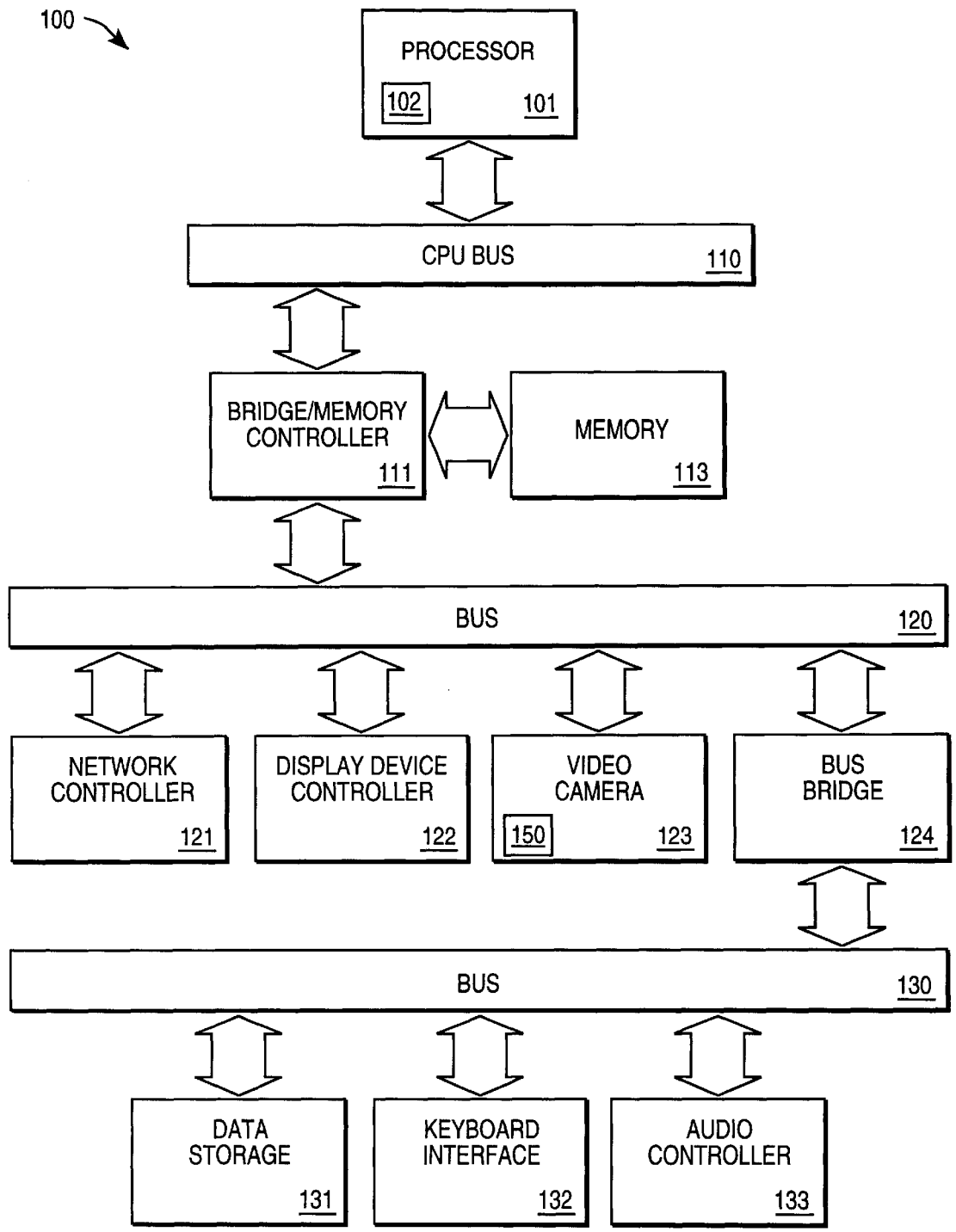
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a static random access memory (SRAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100.

A video camera 123 is coupled to the first I/O bus 120. The video camera 123 operates to capture an image of an object. The video camera 123 includes an image generating unit 150 that regulates an exposure level of an image sensor in the video camera 123. The exposure level of the image sensor is regulated such that it generates image signals with a strength at a predetermined level for generating a high quality charge image. When the strength of the image signals are not at the predetermined level, the image generating unit 150 amplifies selected image signals according to a gain profile to improve the quality of the charge image. The image signals that form the charge image are translated into digital graphical data.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

Figure 2:
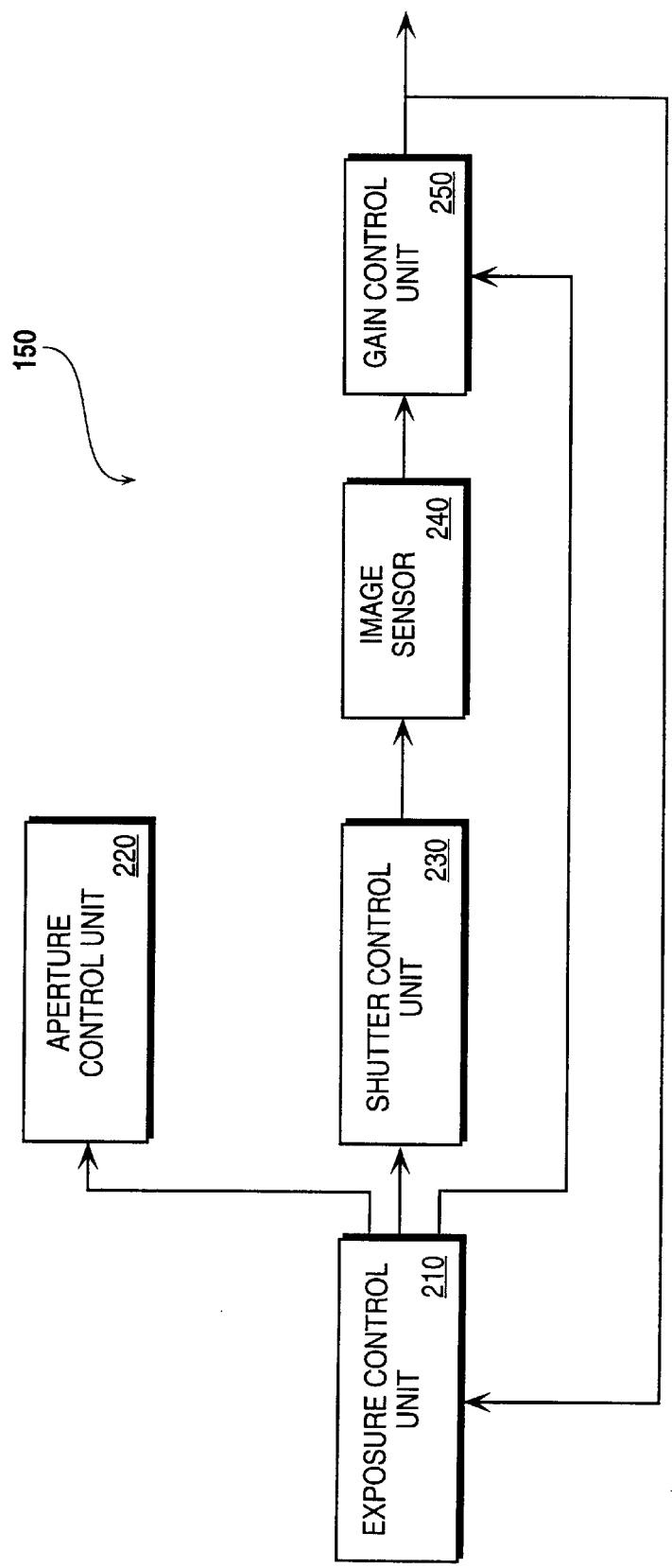
FIG. 2 is a block diagram of an image generating unit in a video camera according to an embodiment of the present invention.

FIG. 2 illustrates an embodiment of an image generating unit 150 according to an embodiment of the present invention. The image generating unit 150 includes an exposure control unit 210. The exposure control unit 210 receives image signals generated by the video camera 123 and analyzes the image signals to determine whether it forms a high quality charge image. When the exposure control unit 210 determines that the image signals forms a charge image that is not high quality, it adjusts the exposure level of the image sensor 240 in order to improve the quality of the charge image.

An aperture control unit 220 is coupled to the exposure control unit 210. The aperture control unit 220 adjusts the size of the opening in lens'iris (not shown), to govern the amount of light admitted on the image sensor 240. When the lens is exposed to bright light, the exposure control unit 210 directs the aperture control unit 220 to adjust the lens'iris to a level that prevents the image sensor 240 from being over exposed. Conversely, when the lens is exposed to low light, the exposure control unit 210 directs the aperture control unit 220 to adjust the lens'iris to a level that prevents the image sensor 240 from being under exposed.

A shutter control unit 230 is coupled to the exposure control unit 210. The shutter control unit 230 adjusts the amount of time during which incoming light forms a single video field. Video is typically recorded at 60 fields per second in the National Television Standards Committee (NTSC) system and 50 fields per second in Phase Alternating Line (PAL) and System Electronique pour Couleur avec Memoire (SECAM) systems. The shutter control unit 230 controls exposure length by adjusting the amount of time during which the image sensor 240 is allowed to accumulate a charge before dumping it and starting another video field. A high shutter speed setting is used when sharper images are desired. To effectuate a higher shutter speed, the amount of time that the image sensor 240 is allowed to form a single video field is reduced. A low shutter speed setting is used to capture low light images. To effectuate a lower shutter speed, the amount of time that the image sensor 240 is allowed to form a single video field is increased.

The image sensor 240 is coupled to the shutter control unit 230. According to one embodiment of the present invention, the image sensor 240 is a CCD. The image sensor 240 includes a plurality of light sensitive cells. An image for recording is projected via the lens onto the image sensor 240. The image projected onto the CCD image sensor charges the cells electrically. The brighter the incoming light, the more powerfully the cells are charged. The charged cells produce a charge image that includes a plurality of image signals that corresponds to light and color information of the recorded image. The exposure level of the image sensor 240 is required to be within a defined range in order for it to produce image signals at a strength that forms a high quality charge image. When the exposure level is outside of the defined range, the recorded image may appear to be too dark or too bright. Proper exposure depends both on the amount of light entering the lens and the amount of time during which the incoming light forms a single video field. It should be appreciated that the image sensor 240 may also be implemented using a CMOS sensor or other sensing device.

A gain control unit 250 is coupled to the image sensor 240 and the exposure control unit 210. The gain control unit 250 receives the image signals from the image sensor 240 and amplifies selected image signals according to a gain profile in response to the exposure control unit 210. The gain control unit 250 sends the amplified image signals to the exposure control unit 210 to be analyzed. The gain profile includes information that identifies the selected image signals and levels of amplification to amplify the selected signals. The gain profile may be selected from a plurality of pre-constructed gain profiles or generated from scratch by a user of the video camera 123. The gain profile may be selected or generated in the gain control unit 250 or downloaded from an external source. The gain control unit 250 allows a user of the video camera 123 to decide which area or areas in a charge image to apply positive or negative gain.

It should be appreciated that the aperture control unit 220, the shutter control unit 230, and the gain control unit 250 may be controlled manually in addition to being controlled by the exposure control unit 210. The image generating unit 150 may be implemented with or without the aperture control unit 220 and the shutter control unit 230. It should also be appreciated that the exposure control unit 210, the aperture control unit 220, the shutter control unit 230, the image sensor 240, and the gain control unit 250 may be implemented using any known circuitry or technique.

Figure 3:
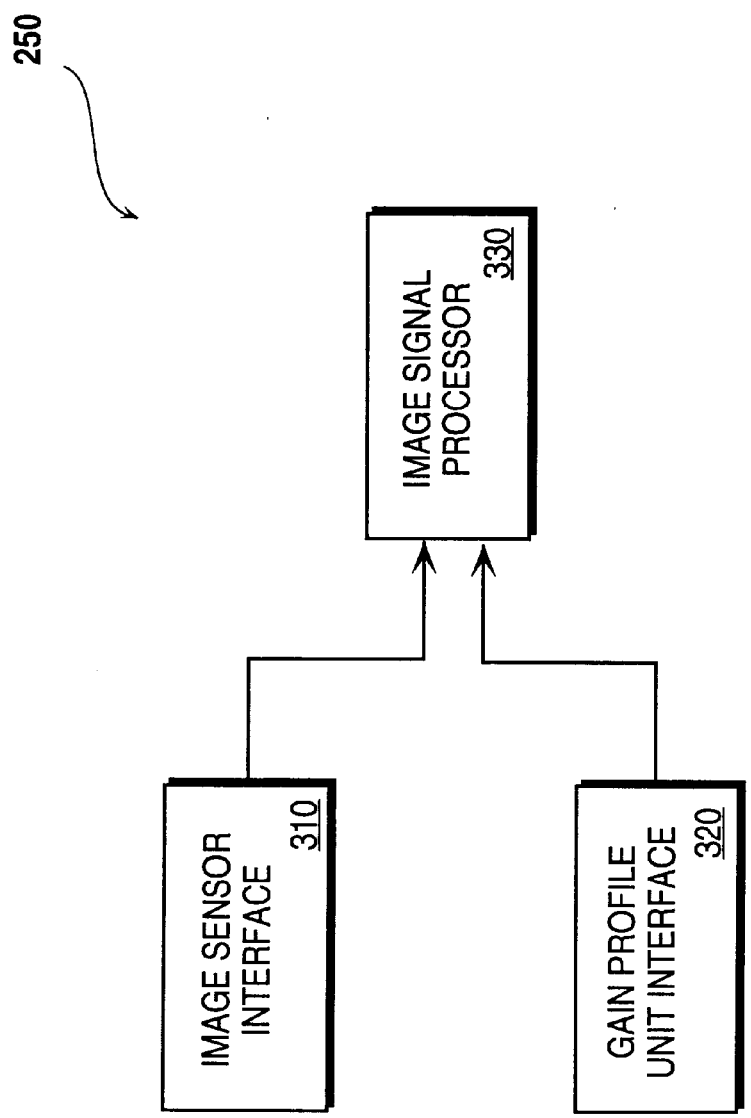
FIG. 3 is a block diagram of a gain control unit in a video camera according to a first embodiment of the present invention.

FIG. 3 illustrates a block diagram of the gain control unit 250 according to a first embodiment of the present invention. The gain control unit 250 includes an image sensor interface 310. The image sensor interface 310 interfaces with the image sensor 240 (shown in FIG. 2) and receives image signals from the image sensor 240 that correspond to a charge image. The gain control unit 250 includes a gain profile unit interface 320. The gain profile unit interface 320 interfaces with a gain profile unit 420 (shown in FIG. 5) that is located external to the video camera 123 (shown in FIG. 1). The gain profile unit interface 320 receives a gain profile from the gain profile unit 420. An image signal processor 330 is coupled to the image sensor interface 310 and the gain profile unit interface 320. The image signal processor 330 receives the image signals from the image sensor interface 310 and the gain profile from the gain profile unit interface 320. The image signal processor 330 amplifies selected image signals of the charge image to an amplification level specified by the gain profile. The image signal processor 330 translates the image signals to digital graphical data.

Figure 4:
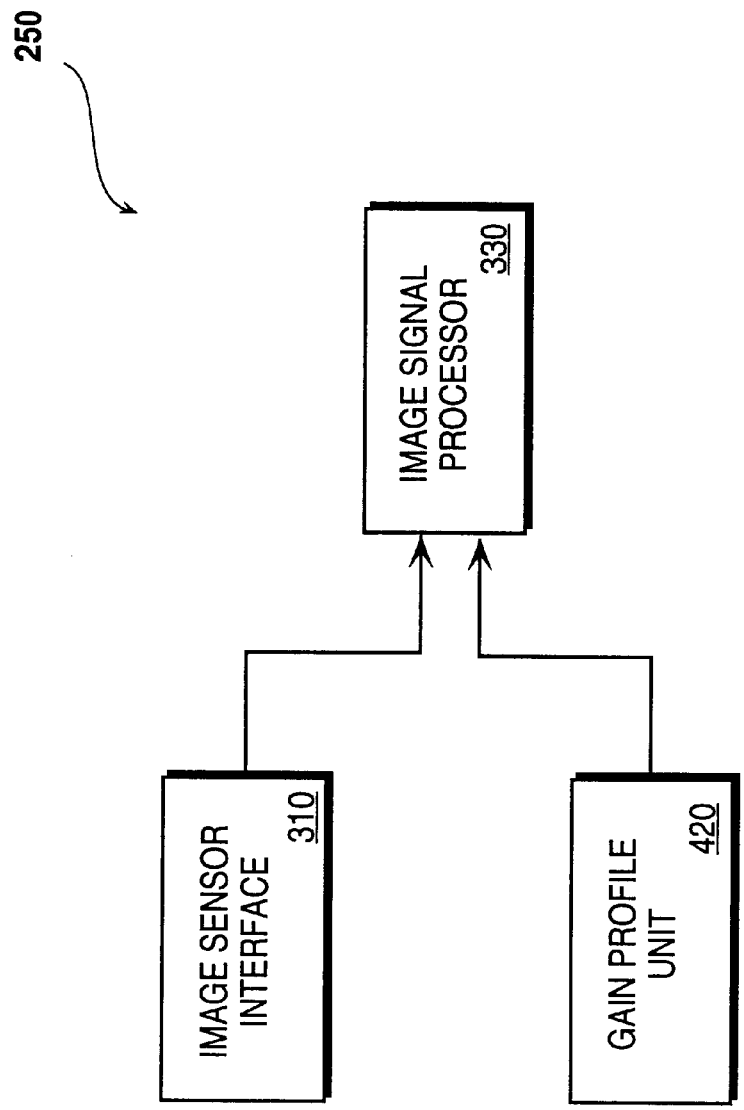
FIG. 4 is a block diagram of a gain control unit in a video camera according to a second embodiment of the present invention.

FIG. 4 illustrates a block diagram of the gain control unit 250 according to a second embodiment of the present invention. In this embodiment of the gain control unit 250, a gain profile unit 420 resides inside the gain control unit 250.

Figure 5:
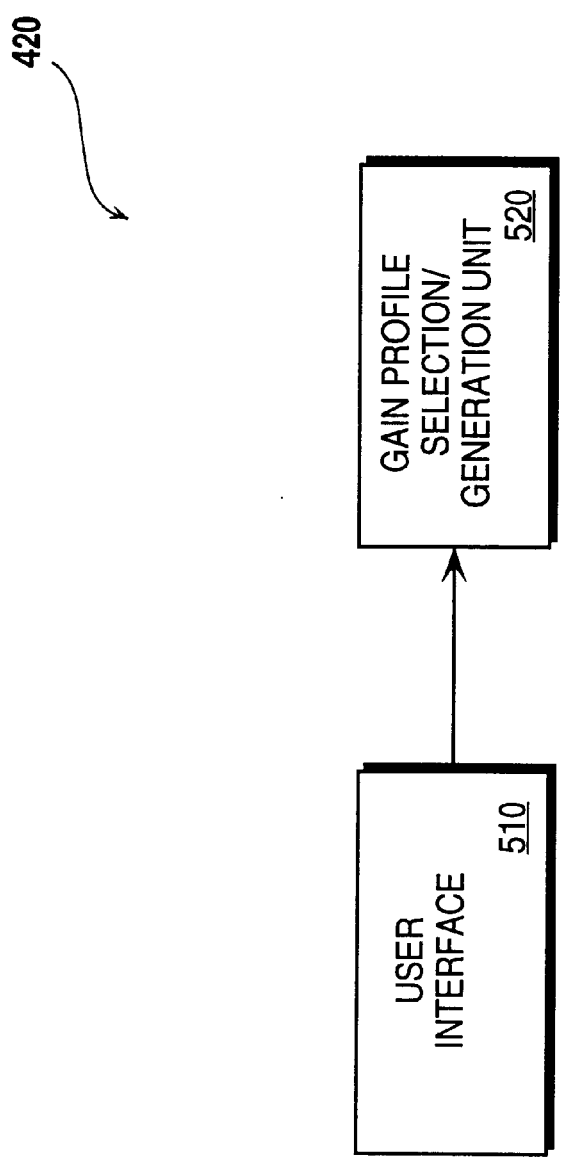
FIG. 5 is a block diagram of a gain profile unit according to an embodiment of the present invention.

FIG. 5 illustrates a block diagram of the gain profile unit 420 according to an embodiment of the present invention. The gain profile unit 420 includes a user interface 510. The user interface 510 allows a user to view digital graphical data that corresponds to a charge image at a current exposure level. The gain profile unit 420 allows the user to select areas in the charge image to apply positive or negative gain using amplification levels to amplify or apply suppression the selected areas.

A gain profile selection/generation unit 520 is coupled to the user interface 510. The gain profile selection/generation unit 520 receives data from the user interface 510 that corresponds to the selected areas and the amplification levels. The gain profile selection/generation unit 520 generates a gain profile that corresponds to the data and sends the gain profile the image signal processor 330 (shown in FIGS. 3 and 4). According to an embodiment of the present invention, the gain profile is a nxm matrix that includes entries that correspond to image signals in the charge image. The entries include values that correspond to amplification levels to amplify or apply suppression to the selected image signals. The gain profile selection/generation unit 520 may also store a plurality of pre-constructed gain profiles. The user interface 510 may operate to allow a user to choose one of the pre-constructed gain profiles to apply to the charge image.

According to an embodiment of the present invention where the gain profile unit 420 resides external to the gain control unit 250, the gain profile unit 420 is implemented as software in the computer system 100 (shown in FIG. 1). The computer system 100 is used to select or generate a gain profile to apply to a charge image. According to one embodiment, selecting or generating a gain profile is performed by the computer system 100 in response to the processor 101 (shown in FIG. 1) executing sequences of instructions in main memory 113 (shown in FIG. 1). Such instructions may be read into memory 113 from another computer-readable medium, such as data storage device 131 (shown in FIG. 1), or from another source via the network controller 121 (shown in FIG. 1). Execution of the sequences of instructions causes the processor 101 to select or generate a gain profile. In an alternative embodiment, hardwired circuitry may be used in place of or in combination with software instructions to implement the present invention. Thus, the present invention is not limited to any specific combination of hardware circuitry and software.

Figure 6:
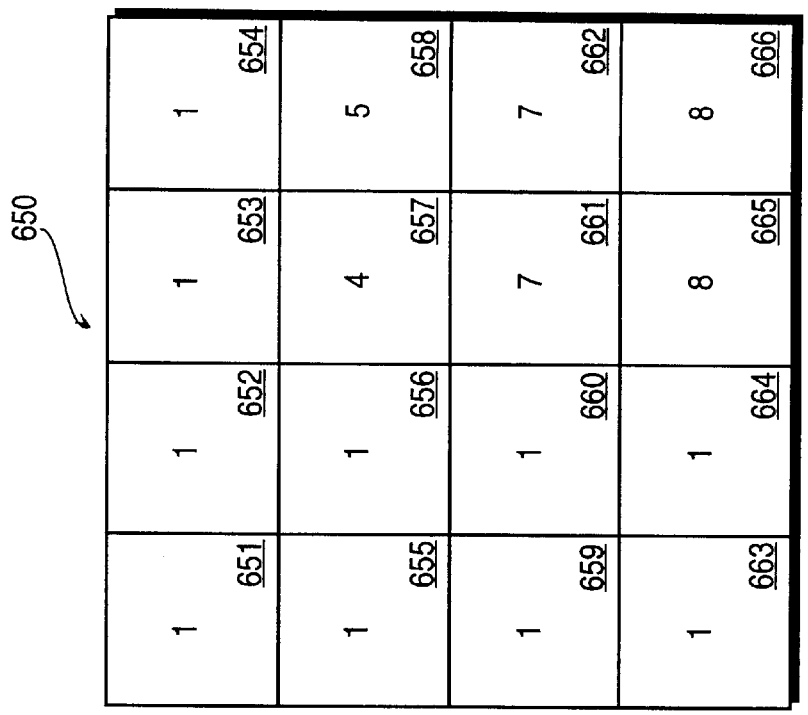
FIG. 6 illustrates a first example of a charge image and a gain profile.
Figure 6:
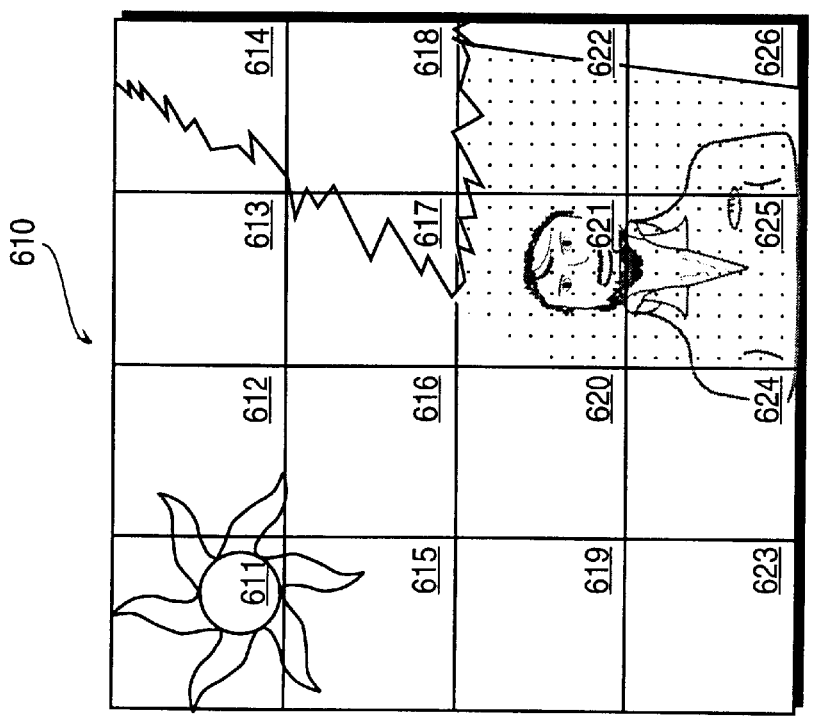

FIG. 6 illustrates a first example of a charge image 610 and a gain profile 650 according to an embodiment of the present invention. The charged image 610 is a recorded image of a person standing underneath a tree. The charged image 610 is shown to be divided into sections 611–626. For the purpose of illustration, the sections are numbered. The area underneath the tree indicated by sections 621–622, and 625–626, is shaded, casting a shadow over the person in sections 621 and 624–626. The area not directly underneath the tree in sections 611–614, 615–618, 619–620, and 623–624 however, is brightly lit.

A gain profile 650 that would improve the quality of the charged image is shown. The gain profile 650 includes a matrix of entries 651–666 that correspond to the sections in the charged image 610. The matrix of entries are numbered for the purpose of illustrations. Entries 651–666 of the gain profile 650 correspond respectively to sections 611–626 of the charge image 610. The entries 651–666 of the gain profile 650 represent amplification levels to amplify image signals corresponding to corresponding sections in the charge image. In this example, the subject of the charge image is located in sections 620–621 and 624–626 of the charge image 610. Sections 621–622 and 625–626 are darkly lit and require amplification to produce a high quality charge image. Thus, amplification levels 7, 7, 8, and 8 are assigned to entries 661–662, and 665–666 of the gain profile 650. Sections 611–614, and 615–617, 619–620, and 623–624 are brightly lit and do not require amplification to produce a high quality charge image. Thus, amplification level 1 is assigned to entries 651–656, and 659–660, and 663–664 and 665 of the gain profile 650.

Figure 7:
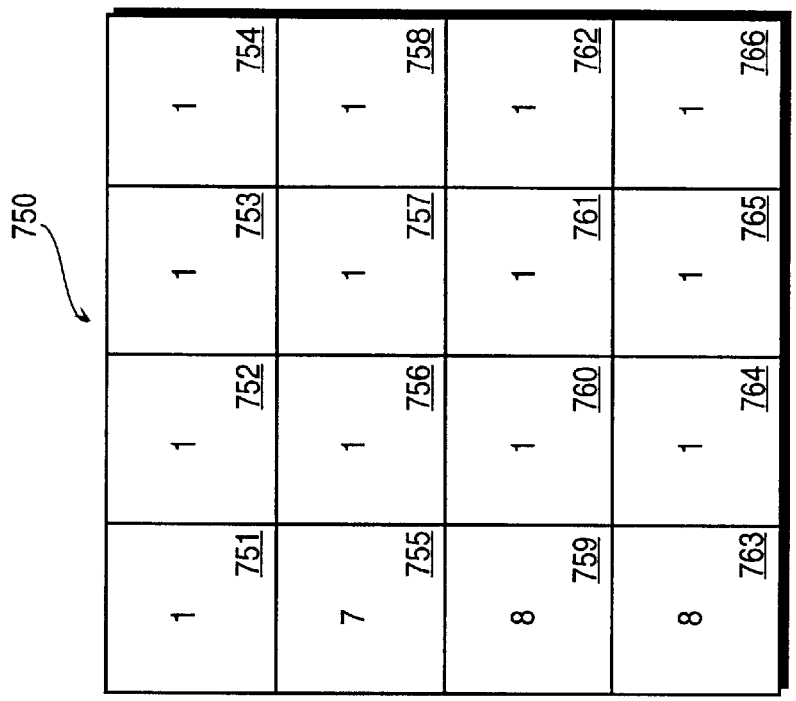
FIG. 7 illustrates a second example of a charge image and a gain profile.
Figure 7:
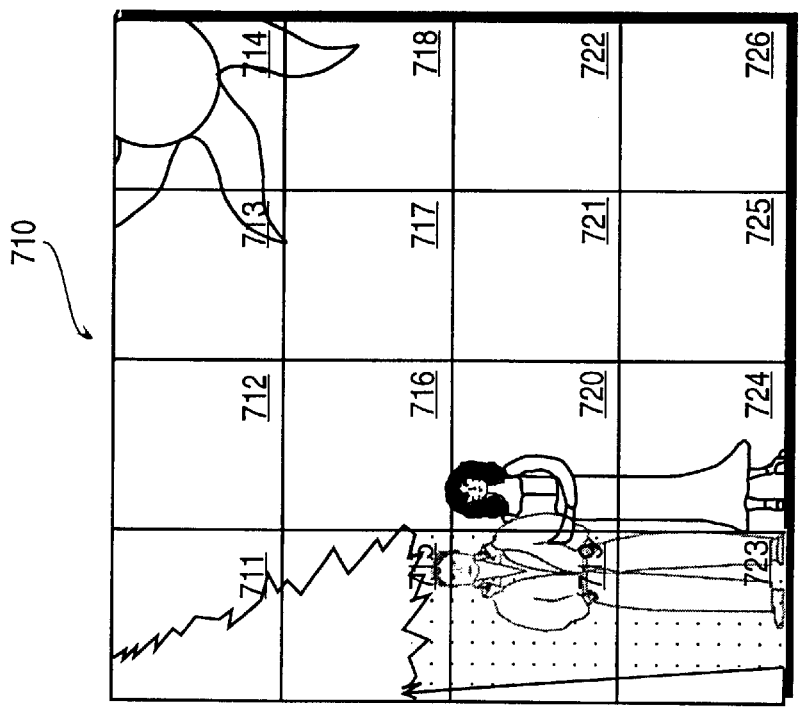

FIG. 7 illustrates a second example of a charge image 710 and a gain profile 750 according to an embodiment of the present invention. The charged image 710 is a recorded image of a couple standing underneath a tree. The charged image 710 is shown to be divided into sections 711–726. For the purpose of illustration, the sections are numbered. The area underneath the tree indicated by sections 715, 719, and 723 is shaded, casting a shadow over the person in sections 715, 719, and 723. The area not directly underneath the tree in sections 711–714, 716–718, 720–722, and 724–726 however, is brightly lit.

A gain profile 750 that would improve the quality of the charged image is shown. The gain profile 750 includes a matrix of entries 751–766 that correspond to the sections in the charged image 710. The matrix of entries are numbered for the purpose of illustrations. Entries 751–766 of the gain profile 750 correspond respectively to sections 711–726 of the charge image 710. The entries 751–766 of the gain profile 750 represent amplification levels to amplify image signals corresponding to corresponding sections in the charge image. In this example, the subject of the charge image is located in sections 715–716, 719–720, and 723–724 of the charge image 710. Sections 715, 719, and 723 are darkly lit and require amplification to produce a high quality charge image. Thus, amplification levels 7, 8, and 8 are assigned to entries 715, 719, and 723 of the gain profile 750. Sections 711–714, 716–718, 720–722, and 724–726 are brightly lit and do not require amplification to produce a high quality charge image. Thus, entries 751–754, 756–758, 760–762, and 764–766 of the gain profile 750 are assigned amplification levels of 1.

It should be appreciated that charge images may be divided into any number of sections and that gain profiles may include any number of entries to correspond to the sections of the charge images. It should also be appreciated that any value may be used in the gain profile to describe an amplification level to amplify the image signals.

Figure 8:
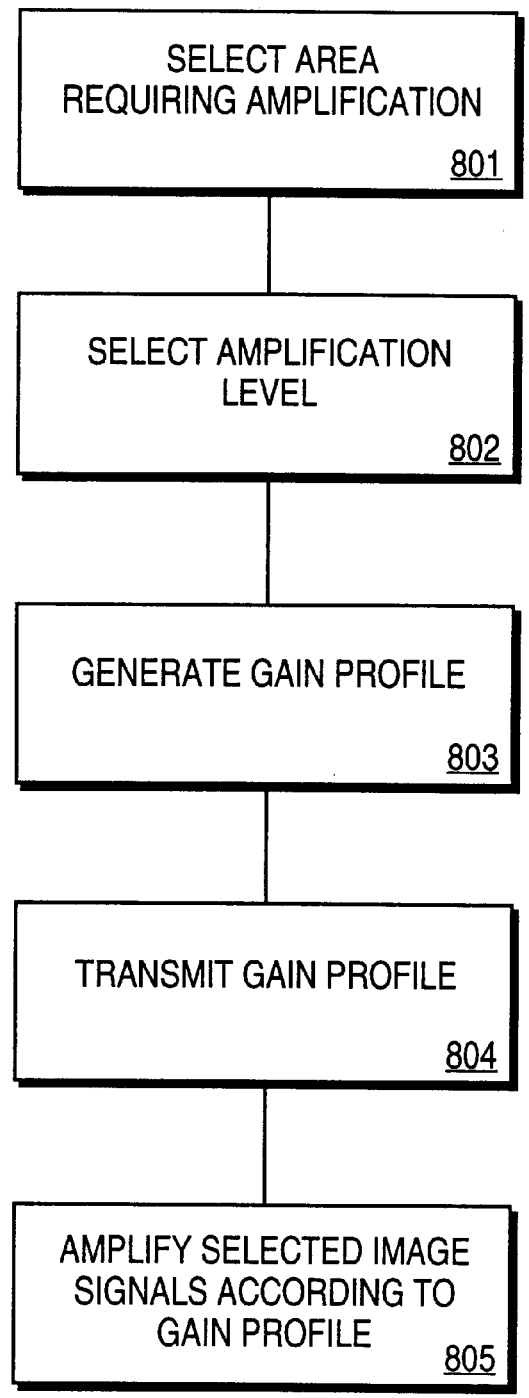
FIG. 8 is a flow chart that illustrates a method for controlling gain applied to image signals according to an embodiment of the present invention.

FIG. 8 is a flow chart that illustrates a method for controlling the gain applied to image signals. At step 801, select an area in a charged image that requires amplification. The area that requires amplification is typically an area in the charge image that is under exposed and appears dark. Selecting an area in the charge image may include selecting divided sections in the charge image that appear dark.

At step 802, select an amplification level to amplify the selected area. Selecting an amplification level may include selecting a level of light or brightness to apply to the selected area.

At step 803, generate a gain profile that includes information that indicates the selected area and the amplification level. According to an embodiment of the present invention, generating a gain profile is achieved by creating a nxm matrix that corresponds to divided sections of the charged image. The nxm matrix includes entries that represent amplification levels to apply to corresponding sections of the charge image.

At step 804, transmit the gain profile to an image signal processor. The gain profile may be generated in a gain profile unit residing inside a gain unit of a video camera or outside a gain unit of a video camera. In an embodiment of the present invention where the gain profile unit is implemented as software run in a computer system, the gain profile may be transmitted to the image signal processor via a gain profile unit interface through a Universal Serial Bus (USB) or other transmission medium.

At step 805, amplify the selected image signals according to the gain profile. The selected image signals may be amplified in the image signal processor in the gain control unit.

It should be appreciated that the gain profile used to determine which image signals to amplify and to what amplification level may also be selected from a plurality of pre-constructed gain profiles in addition to being created from scratch by a user.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A video camera, comprising:
    an image sensor to receive a light exposure and to generate image signals that form a charge image;
    a gain control unit, coupled with the image sensor, to amplify selected image signals from the image sensor according to a gain profile; and
    an exposure control unit, coupled with the image sensor to regulate the light exposure received and coupled with the gain control unit to receive the image signals and to regulate a strength of the image signals, instructing the gain control unit to amplify the selected image signals when the strength of the image signals is below a first level.

2. The video camera of claim 1, wherein the gain profile comprises information regarding the identity of the selected image signals and levels of amplification to amplify the selected signals.

3. The video camera of claim 1, further comprising a manual control unit, coupled with the gain control unit to instruct the gain control unit to amplify the selected image signals according to the gain profile of a user preference.

4. The video camera of claim 1, wherein the gain profile is downloaded from an external system.

5. The video camera of claim 3, wherein the gain profile is stored in the gain control unit.

6. The video camera of claim 3, further comprising an aperture control unit, coupled to the exposure control unit, that adjusts the amount of light admitted through an iris of the video camera according to the exposure control unit.

7. The video camera of claim 3, further comprising a shutter control unit, coupled to the exposure control unit and the image sensor, that adjusts an amount of time the image sensor has to respond to light according to the exposure control unit.

8. The video camera of claim 1, wherein the image sensor is a charge coupled device (CCD).

9. The video camera of claim 1, wherein the image sensor is a CMOS sensor.

10. A computer system, comprising:
    a bus;
    a processor coupled to the bus; and
    a video camera, coupled to the bus, that includes
        an image sensor to receive a light exposure and to generate image signals that form a charge image;
        a gain control unit, coupled with the image sensor, to amplify selected image signals from the image sensor according to a gain profile; and
        an exposure control unit coupled with the image sensor to regulate the light exposure received and coupled with the gain control unit to receive the image signals and to regulate a strength of the image signals, instructing the gain control unit to amplify the selected image signals when the strength of the image signals is below a first level.

11. The computer system of claim 10, wherein the gain profile comprises information regarding the identity of the selected image signals and levels of amplification to amplify the selected signals.

12. The computer system of claim 10, further comprising a manual control unit, coupled with the gain control unit to instruct the gain control unit to amplify the selected image signals according to the gain profile of a user preference.

13. The computer system of claim 10, wherein the gain profile is downloaded from an external system.

14. The computer system of claim 10, wherein the gain profile is stored in the gain control unit.

15. A method for managing image signals, comprising:
    generating the gain profile;
        amplifying selected image signals of a first charge image according to a gain profile to generate image signals of a second charge image; and
    analyzing the image signals of the second charge image to adjust at least one of an exposure duration or an aperture.

16. The method of claim 15, wherein generating the gain profile comprises:
    selecting an area in the charge image that requires amplification; and selecting an amplification level to amplify the selected area.

17. A method for managing image signals, comprising:
    selecting the gain profile from a plurality of pre-constructed gain profiles;
        amplifying selected image signals of a first charge image according to a gain profile to generate image signals of a second charge image; and
        analyzing the image signals of the second charge image to adjust at least one of an exposure duration or an aperture.

18. A method for managing image signals, comprising:

downloading the gain profile from an external system;

amplifying selected image signals of a first charge image according to a gain profile to generate image signals of a second charge image; and analyzing the image signals of the second charge image to adjust at least one of an exposure duration or an aperture.

19. A machine executable encoding of a method comprising one or more storage medium having executable encodings stored thereon, which when executed by one or more machines, causes the one or more machines to:

purvey an exposure for an image sensor for a duration sufficient to achieve a first exposure level to produce image signals of a first charge image;

amplify selected image signals of the first charge image according to a gain profile to generate image signals of a second charge image;

analyze the image signals of the second charge image to adjust the first exposure level by adjusting the purveyance of the exposure for the image sensor;

analyze a strength of the image signals of the second charge image; and amplify selected image signals when the strength of the image signal is below a first signal level.

20. The machine executable encoding of the method of claim 19, which further causes the one or more machines to:

amplify the selected image signals according to the gain profile of a user preference.

21. An apparatus comprising:

means for purveying an exposure for an image sensor for producing image signals of a first charge image;

means for amplifying selected image signals of the first charge image according to a gain profile to generate image signals of a second charge image;

means for analyzing the image signals of the second charge image to adjust at least one of an exposure duration or an aperture; and means for amplifying the selected image signals according to the gain profile of a user preference.

22. The apparatus of claim 21, further comprising:

means for analyzing a strength of the image signals of the second charge image; and means for amplifying selected image signals when the strength of the image signals is below a first signal level.

23. The apparatus of claim 22 further comprising:

means for adjusting a duration of the exposure of the image sensor in response to analyzing the image signals of the second charge image.

24. The apparatus of claim 23 further comprising:

means for adjusting an aperture in response to analyzing the image signals of the second charge image.

* * * * *